Dec. 28, 1926.
H. A. BREMER
1,611,879
VISUAL INDICATOR
Filed March 4, 1926
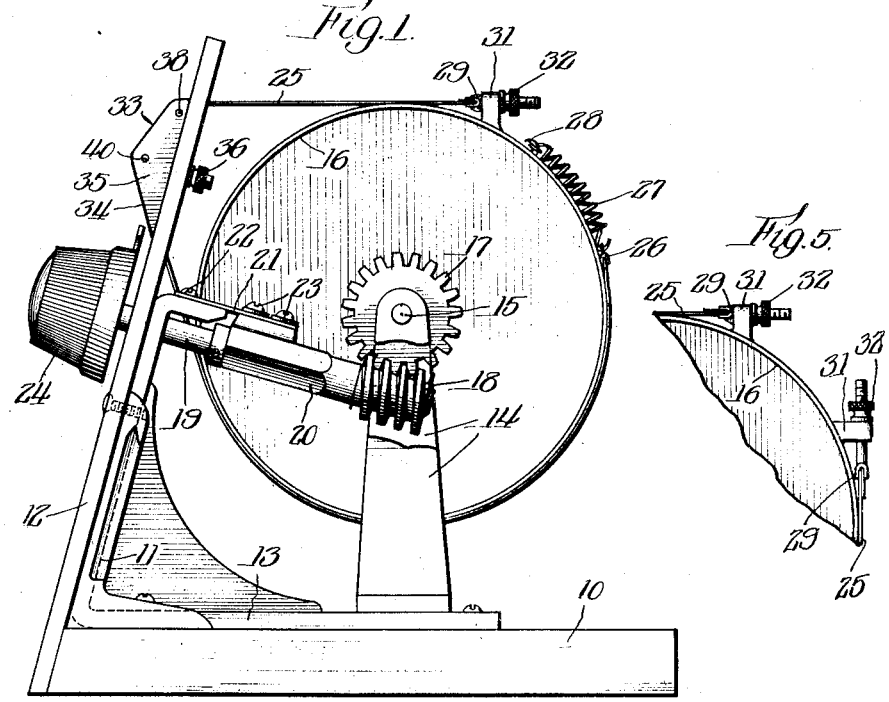
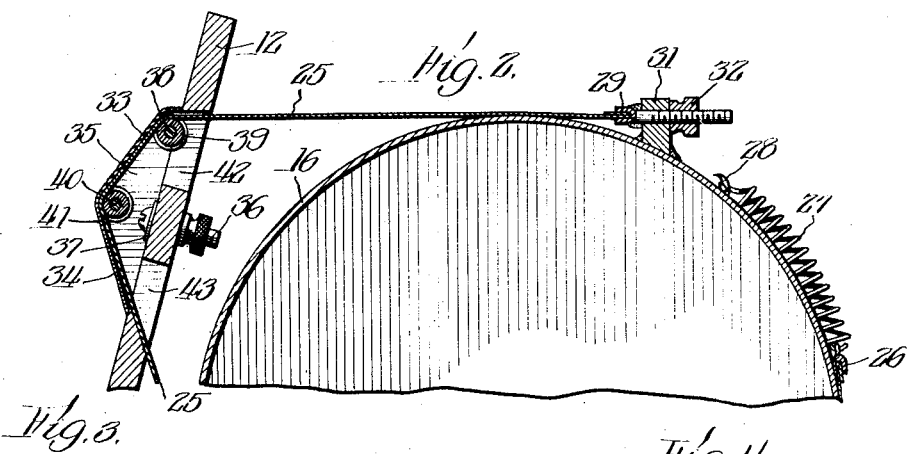
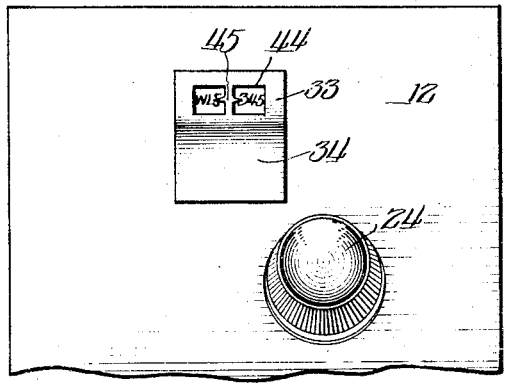
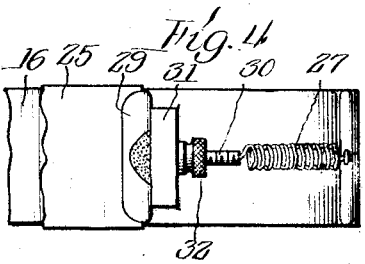
Inventor:
Harry A. Bremer,
By Samuel N. Pond, Atty.

Patented Dec. 28, 1926.

1,611,879

UNITED STATES PATENT OFFICE.

HARRY A. BREMER, OF CHICAGO, ILLINOIS.

VISUAL INDICATOR.

Application filed March 4, 1926. Serial No. 92,123.

This invention relates to indicators of the visual type, and has been designed for use more particularly in connection with radio receiving apparatus to indicate the wave lengths of sending stations and facilitate the tuning of the receiving instrument to the wave length of any sending station which the user desires to get. The device, however, is not limited in its applications to radio receiving apparatus, but is capable of use as an indicator in other relations and situations.

One well-known form of visual indicator comprises a panel formed with an aperture, and a drum rotatably mounted in rear of the panel so that a portion of its periphery, carrying scale indicia, is visible through the opening as the drum is turned. My present invention embodies the same broad principle, but in lieu of applying the scale indicia to the periphery of the drum, I attach to the periphery of the drum the two ends of a ribbon or tape on the outer surface of which the scale indicia are printed, and this ribbon or tape is passed through an opening or openings in the panel and over a pair of rollers mounted in or on the front of the panel, the turning of the drum causing the tape to travel over said rollers through a reading field located between said rollers and preferably equipped with a stationary pointer cooperating with the scale marks on the ribbon. In the preferred embodiment of the invention herein shown and later described in detail, one end of the ribbon is attached to the periphery of the drum through the intermediary of a pull spring, while the other end is attached to the periphery of the drum through the intermediary of a lengthwise adjustable connecting element.

In order that the invention, its mode of use, and its advantages may be clearly understood by persons skilled in the art I have illustrated one embodiment thereof in the accompanying drawings, in which—

Fig. 1 is a side elevation of my improved indicator shown applied to the instrument board or panel of a radio receiving set;

Fig. 2 is an enlarged vertical section through the upper portion of the device shown in Fig. 1;

Fig. 3 is a partial front elevation of the instrument board or panel showing the ribbon and roller housing formed with a scale reading window and pointer, and the knob for turning the drum;

Fig. 4 is a partial top plan view, more clearly illustrating the attachments of the ribbon to the periphery of the drum; and Fig. 5 is a fragmentary view of a modification.

Referring to the drawing, 10 designates a baseboard, on which is mounted, by angle brackets 11, an instrument board or panel 12. 13 designates an angle bracket fitted into the angle between the boards 10 and 12, on the base member of which are mounted a pair of parallel spaced posts 14. In the tops of said posts is journaled a shaft 15, fast on one projecting end of which is a drum 16. Fast on the shaft 15 between the posts 14 is a worm gear 17 that is driven by a worm 18 formed on an operating shaft 19 journaled in an extended bearing 20 that, in the instance shown, is attached to the upper end of the angle bracket 13 by a steel blade 21 and fastening screws 22 and 23. On the outer end of the shaft 19 is the usual turning knob 24. 25 designates the ribbon or tape, preferably made of some flexible non-elastic material, such as celluloid, on the outer surface of which are printed or otherwise formed scale readings, such, for instance, as the initials of radio broadcasting stations and their wave lengths. On one end of the ribbon 25 is a clamp strip 26 anchored to one end of a pull spring 27, the other end of said spring being anchored to a hook 28 on the periphery of the drum. The other end of the strip receives a similar clamp strip 29 (Fig. 4) to which is soldered or otherwise secured the head of a screw 30 that passes through an aperture in a lug 31 on the periphery of the drum, said screw being equipped with an adjusting nut 32 bearing against the rear face of the lug 31.

On the front face of the instrument board 2 is a sheet-metal housing formed with upper and lower flat divergent faces 33 and 34, respectively, and side walls 35, said housing being conveniently attached to the instrument board by means of screw bolts 36 passed through the board and through inturned apertured attachment lugs 37 on the rear edges of the side walls 35. Secured in and between the side walls 35 at the upper end of the latter is a small shaft 38 on which is journalled a roller 39, and similarly mounted in and between said side walls substantially below the apex of the front walls 33 and 34 is a small shaft 40 on which is journaled a similar roller 41. The ribbon 25 extends through openings 42 and 43 in the instrument board and over the rollers 39, 41, whereby a portion of said ribbon is caused to lie directly behind and parallel with the upper wall 33 of the casing. As shown in Fig. 3, said upper wall is formed with a window 44 and a centrally disposed pointer or index 45.

When the device herein shown is used to pick up radio sending stations and tune the receiving instrument to any particular station, the drum shaft 15 is, of course, suitably geared to the condenser or any other tuning member of the receiving set, and the outer surface of the ribbon 25 may be equipped on one side with the initial letters of the sending stations and on the other side with the wave meter lengths of the respective stations, as indicated in Fig. 3. These indicia are, of course, printed on the ribbon in such order that when the drum is turned to expose the indicia of any particular station through the window 44, the receiving instrument will be roughly tuned to that station. The instrument is then adjusted to a closer degree of accuracy in the following manner. The operator, disregarding the reading field at the window 44, tunes the instrument by turning the knob 24 and any other manual control or controls that the instrument may be equipped with until the instrument yields the clearest and most perfect rendition of the matter broadcasted from the particular sending station. At such point, the initials and wave length readings of that station should be wholly or partially visible through window 44, but they may not register exactly with the pointer 45. If such is the case, the operator turns the adjusting nut 32 in one direction or the other until the indicia exactly register with the pointer. Thereafter, the sending station may be picked up at its best by simply turning the drum until the indicia of the sending station are in exact register with the pointer.

I prefer to connect one end of the ribbon or tape to the periphery of the drum through an elastic connection, such as the pull spring 27, since this automatically takes up any slack and maintains the ribbon taut. The described adjustment of the ribbon, however, may be effected by the modification shown in Fig. 5, wherein both ends of the ribbon are adjustably attached to the periphery of the drum by the adjustable means shown in Fig. 1. In such case, to adjust the ribbon lengthwise to secure an accurate reading, one of the adjusting nuts 32 is, of course, turned up while the other is simultaneously backed off.

I claim—

1. In a visual indicator of the type described, the combination of a panel formed with an opening, a rotatable drum mounted behind said panel, on an axis parallel with the plane of the latter, ribbon guiding means on said panel, and a ribbon attached at its ends to the periphery of and encircling said drum and extending through said opening and over said guiding means, said ribbon carrying indicia on its outer surface.

2. In a visual indicator of the type described, the combination of a panel formed with an opening, a rotatable drum behind said panel, ribbon guiding means on said panel, and a ribbon attached at its ends to the periphery of said drum by connections permitting lengthwise adjustment of the ribbon, said ribbon extending through said opening and over said guiding means and carrying indicia on its outer surface.

3. In a visual indicator of the type described, the combination of a panel formed with an opening, a rotatable drum behind said panel, ribbon guiding means on said panel, and a ribbon attached at both ends to the periphery of said drum and extending through said opening and over said guiding means and carrying indicia on its outer surface, one end of said ribbon being attached to said drum through the intermediary of an elastic connection whereby said ribbon is maintained taut.

4. In a visual indicator of the type described, the combination of a panel formed with an opening, a rotatable drum behind said panel, ribbon guiding means on said panel, and a ribbon attached at one end to the periphery of said drum through the intermediary of a pull spring and at its other end attached to the periphery of said drum through a lengthwise adjustable connection, said ribbon extending through said opening and over said guiding means and carrying indicia on its outer surface.

HARRY A. BREMER.